(12) United States Patent  
Lovett et al.

(10) Patent No.: US 7,600,364 B2
(45) Date of Patent: Oct. 13, 2009

(54) SECTIONALIZED BELT GUIDE FOR DRAPER BELT IN AN AGRICULTURAL HARVESTING MACHINE

(75) Inventors: Benjamin M. Lovett, Colona, IL (US); Bruce A. Coers, North Hillsdale, IL (US); John Andrios, Geneseo, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/173,445

(22) Filed: Jul. 15, 2008

(65) Prior Publication Data

US 2009/0007533 A1    Jan. 8, 2009

Related U.S. Application Data

(63) Continuation-in-part of application No. 12/109,672, filed on Apr. 25, 2008, now Pat. No. 7,549,280, which is a continuation-in-part of application No. 11/366,033, filed on Mar. 2, 2006, now Pat. No. 7,412,816.

(51) Int. Cl.
*A01D 43/00* (2006.01)
(52) U.S. Cl. ....................................................... 56/181
(58) Field of Classification Search .............. 198/844.1, 198/846, 847, 834, 835, 523; 56/181, 14.5, 56/DIG. 17, 128, 179, 162, 158, 14.4, 153
See application file for complete search history.

(56) References Cited

U.S. PATENT DOCUMENTS 923,084 A    5/1909  Simmons
1,862,101 A   6/1932  Pax
2,347,365 A   4/1944  Paradise
2,509,371 A * 5/1950  Schroeppel ................ 56/14.4
2,608,041 A   8/1952  Schoenrock
2,720,743 A  10/1955  Prather
2,795,922 A   6/1957  Hume
2,999,348 A   9/1961  Cunningham
5,459,986 A  10/1995  Talbot et al.
5,711,140 A   1/1998  Burmann
6,202,397 B1  3/2001  Watts et al.
6,351,931 B1  3/2002  Shearer
2005/0022491 A1  2/2005  Zurn et al.
2007/0193243 A1  8/2007  Schmidt et al.

* cited by examiner

*Primary Examiner*—Árpád Fábián-Kovács
(74) *Attorney, Agent, or Firm*—Taylor & Aust, P.C.

(57) ABSTRACT

A cutting platform for use with an agricultural harvesting machine includes a plurality of platform sections. At least one platform section includes a cutterbar assembly movable in a localized manner in upwards and downwards directions, an endless belt having a leading edge, a plurality of belt supports mounted to the cutterbar assembly, and a plurality of belt guides. Each belt support is at least partially positioned under the leading edge of the endless belt, and includes at least one upwardly extending clip. Each belt guide partially overlies the leading edge of the endless belt. Each belt guide includes at least one clip hole for receiving a corresponding clip, and a rear surface which is attached to a belt support or the cutterbar assembly.

16 Claims, 14 Drawing Sheets

SECTIONALIZED BELT GUIDE FOR DRAPER BELT IN AN AGRICULTURAL HARVESTING MACHINE

CROSS REFERENCE TO RELATED APPLICATIONS

This is a continuation-in-part of U.S. patent application Ser. No. 12/109,672, entitled "SECTIONALIZED BELT GUIDE FOR DRAPER BELT IN AN AGRICULTURAL HARVESTING MACHINE", filed Apr. 25, 2008 now U.S. Pat. No. 7,549,280; which is a continuation-in-part of U.S. patent application Ser. No. 11/366,033, entitled "SECTIONALIZED BELT GUIDE FOR DRAPER BELT IN AN AGRICULTURAL HARVESTING MACHINE", filed Mar. 2, 2006, now U.S. Pat. No. 7,412,816 each of which are incorporated herein by reference.

FIELD OF THE INVENTION

The present invention relates to agricultural harvesting machines, and, more particularly, to agricultural combines including a draper cutting platform.

BACKGROUND OF THE INVENTION

An agricultural harvesting machine such as a combine includes a head and a feeder housing which remove the crop material from the field, gather the crop material and transport the crop material to a separator. In the case of thinner stemmed crops such as soybeans, wheat, etc. which may be cut with a sickle bar carrying a plurality of knives, the head may also be known as a cutting platform. The separator removes the grain crop material from the non-grain crop material. The grain is cleaned and deposited in a grain tank. When the grain tank becomes full, an unloading auger which is positioned alongside the combine during harvesting is moved to the unloading position in which the auger extends approximately perpendicular to the longitudinal axis of the combine. The combine drives alongside a vehicle into which the grain is to be unloaded, such as a semi-trailer, and the unloading auger is actuated to discharge the grain into the vehicle.

A cutting platform may generally be of two types. One type typically has a sheet metal floor with a dual feed auger near the rear of the cutting platform for feeding the crop material longitudinally to the feeder housing. A cutting platform of this type with auger feed is more common.

Another type of cutting platform, also known as a draper platform, utilizes a flat, wide belt, referred to as a draper or draper belt to convey crop material. The arrangement and number of belts vary among platforms. One style of draper platform has two side belts that convey crop material longitudinally, to the center of the platform, where a center feed belt moves the crop material laterally into the feeder housing. Each belt is wrapped around a pair of rollers, one being a drive roller and the other being an idler roller. An example of this type draper arrangement is disclosed in U.S. Pat. No. 6,202,397, which is assigned to the assignee of the present invention.

An advantage of a draper platform is that larger amounts of crop material can be transported without plugging, etc. For example, with wide platforms approaching 40 feet or even larger, the amount of crop material transported to the feeder housing can be substantial. With an auger feed platform, the crop material may bind between the auger and the back wall of the platform. In contrast, with a draper platform, the crop material is carried on top of the belt with less chance for plugging.

Draper platforms currently in use have a rigid framework not allowing the framework to flex to any appreciable extent during use. The draper platform can be placed in a "float" position such that the cutterbar at the leading edge does not dig into the ground, but the leading edge of the platform itself cannot flex across the width of the platform as a result of uneven ground terrain. This results in some crop material being missed in ground depressions, etc., while also possibly causing a part of the cutterbar to dig into localized ground elevations (e.g., small mounds, etc.). Of course, missed crop material directly translates into missed revenue, and localized gouging of soil can cause additional repair expenses resulting from broken knives, knife guards, etc.

What is needed in the art is a draper platform which better follows the ground contour during operation, and has modular components which are more easily assembled and disassembled.

SUMMARY OF THE INVENTION

The invention in one form is directed to a cutting platform for use with an agricultural harvesting machine, including a plurality of platform sections. At least one platform section includes a cutterbar assembly movable in a localized manner in upwards and downwards directions, an endless belt having a leading edge, a plurality of belt supports mounted to the cutterbar assembly, and a plurality of belt guides. Each belt support is at least partially positioned under the leading edge of the endless belt, and includes at least one upwardly extending clip. Each belt guide partially overlies the leading edge of the endless belt. Each belt guide includes at least one clip hole for receiving a corresponding clip, and a rear surface which is attached to a belt support or the cutterbar assembly.

The invention in another form is directed to an agricultural harvesting machine including a base unit having a feeder housing, and a cutting platform attached to the feeder housing. The cutting platform includes a plurality of platform sections. At least one platform section includes a cutterbar assembly movable in a localized manner in upwards and downwards directions, an endless belt having a leading edge, a plurality of belt supports mounted to the cutterbar assembly, and a plurality of belt guides. Each belt support is at least partially positioned under the leading edge of the endless belt, and includes at least one upwardly extending clip. Each belt guide partially overlies the leading edge of the endless belt. Each belt guide includes at least one clip hole for receiving a corresponding clip, and a rear surface which is attached to a belt support or the cutterbar assembly.

BRIEF DESCRIPTION OF THE DRAWINGS

FIG. 9 is a fragmentary, rear perspective view of the leading edge shown in FIG. 8;

DETAILED DESCRIPTION OF THE INVENTION

Figure 1:
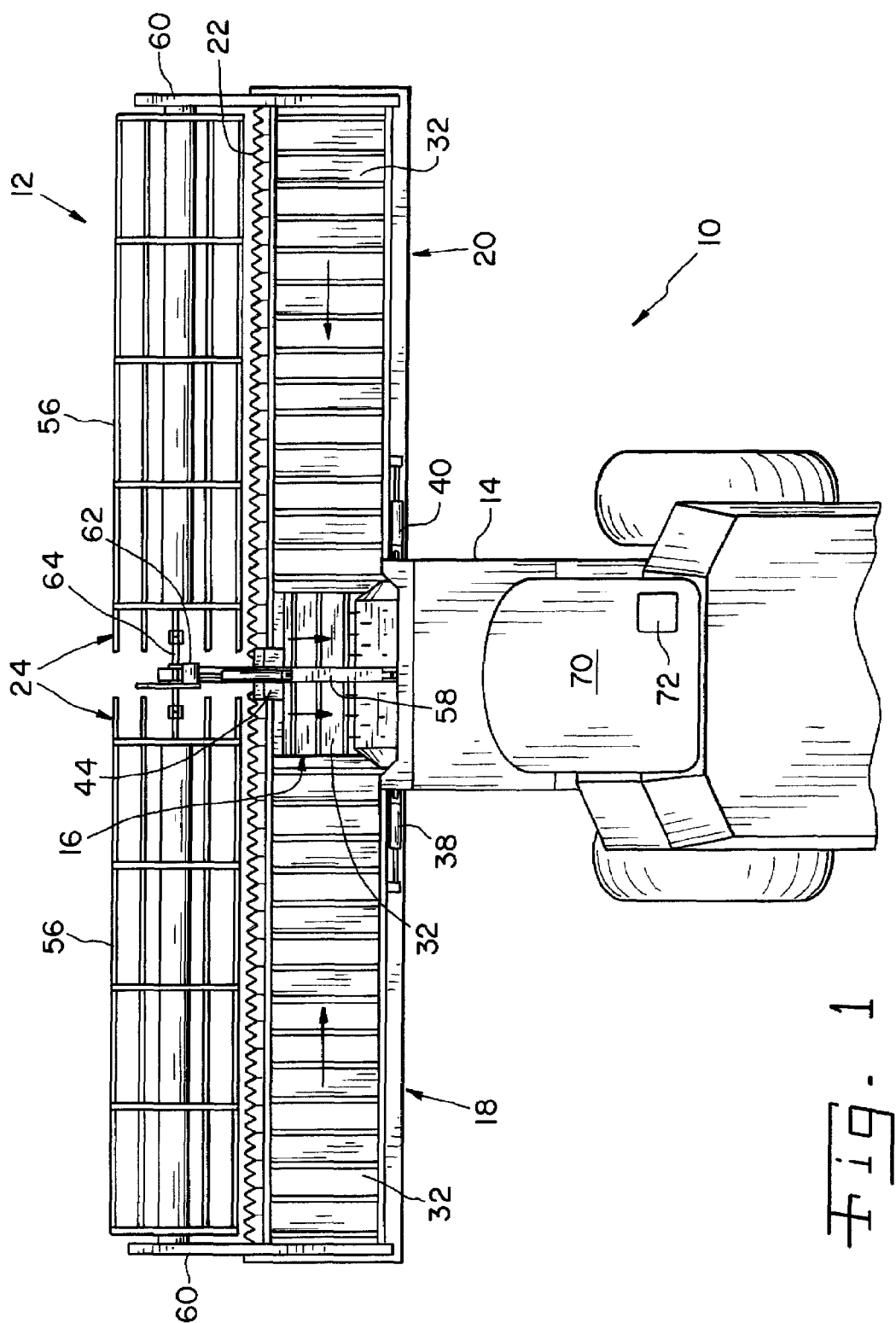
FIG. 1 is a fragmentary, top view of an agricultural combine including an embodiment of a draper platform of the present invention.
Figure 2:
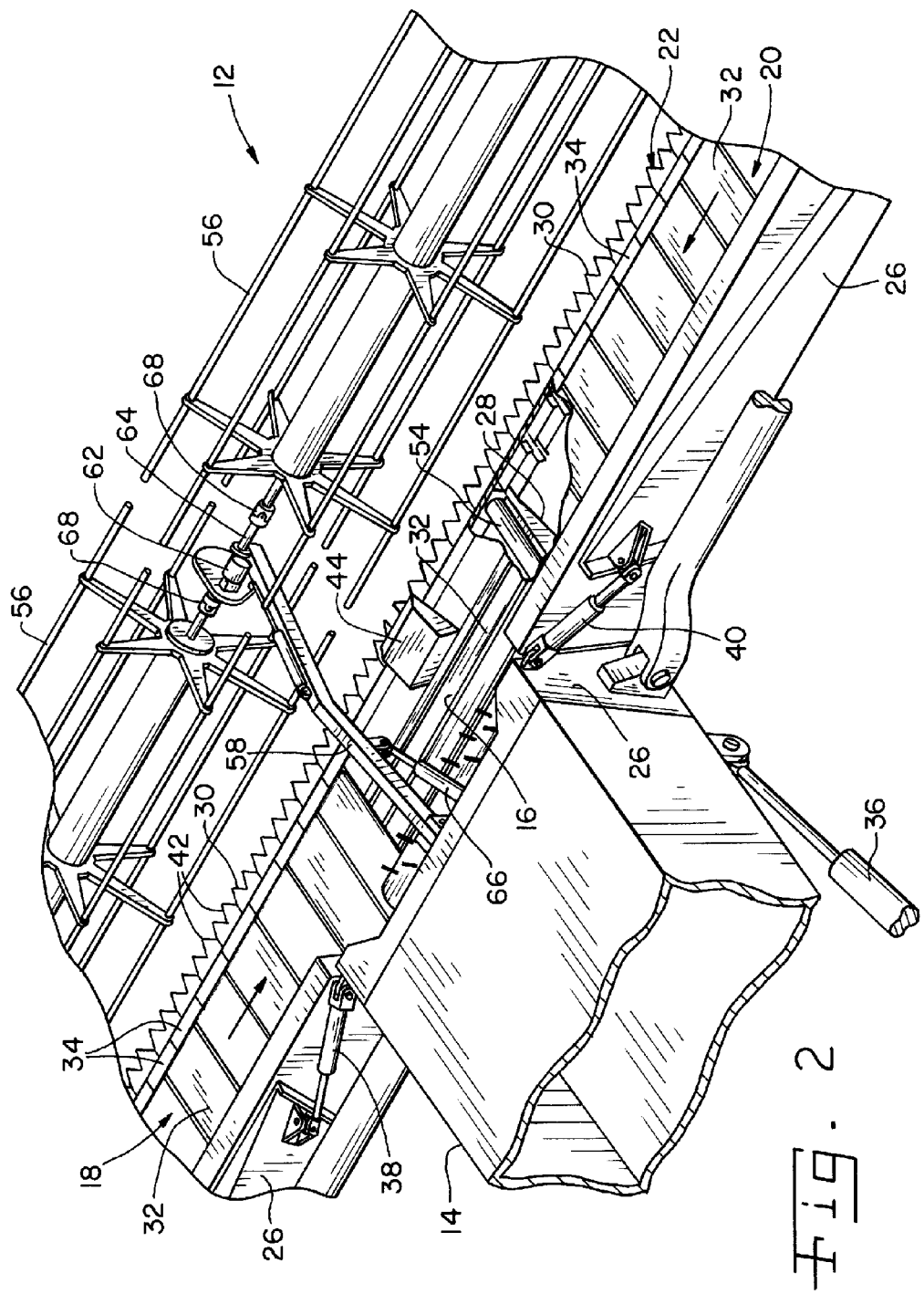
FIG. 2 is a fragmentary, perspective view of the agricultural combine of FIG. 1.
Figure 3:
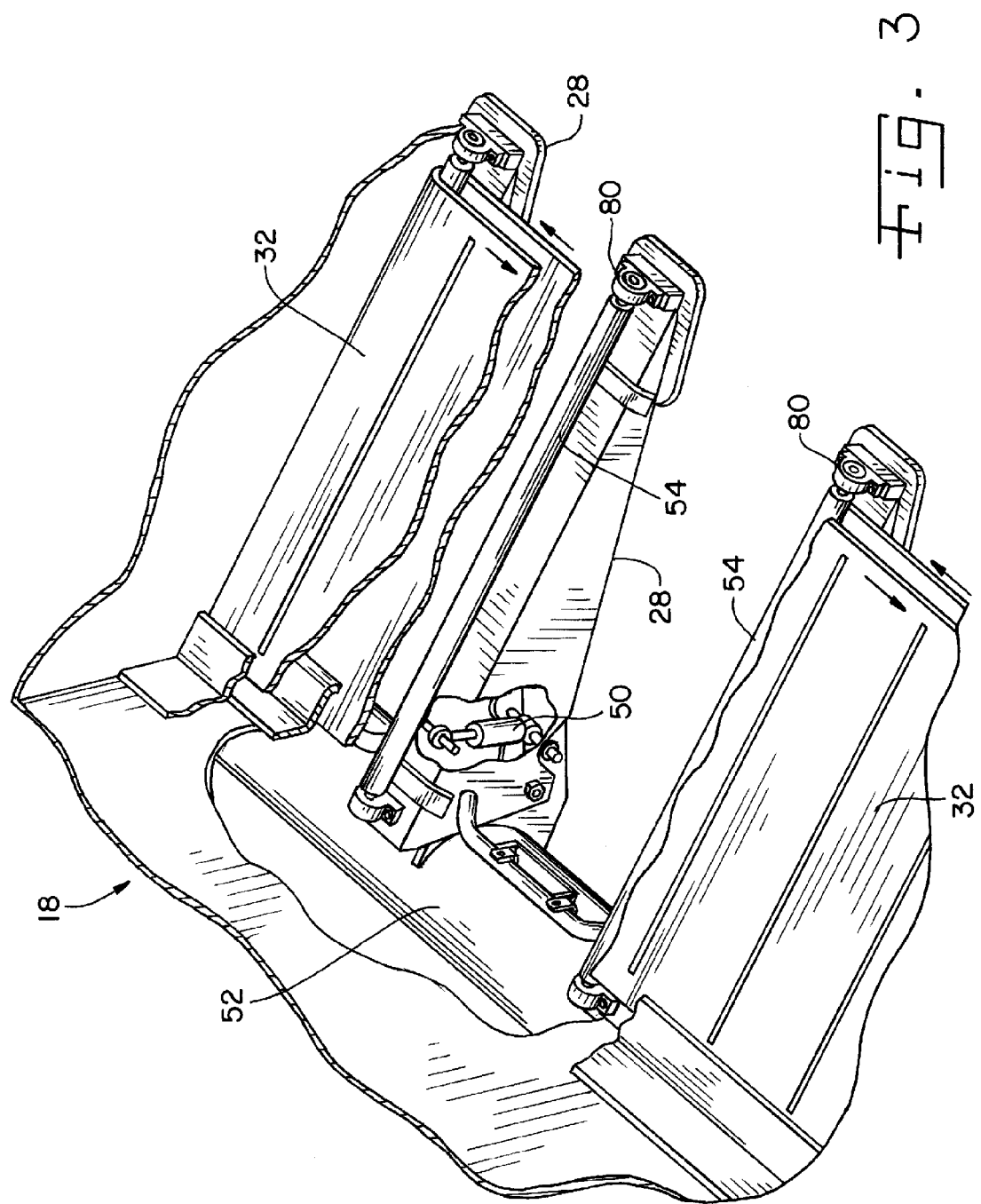
FIG. 3 is a fragmentary, perspective view of the cutting platform shown in FIGS. 1 and 2.

Referring now to the drawings, and, more particularly to FIGS. 1 and 2, there is shown an agricultural harvesting machine in the form of a combine 10 including an embodiment of a cutting platform 12 of the present invention. Combine 10 includes a feeder housing 14 which is detachably coupled with cutting platform 12. Feeder housing 14 is typically attached to and considered part of the base unit providing both propulsion power as well as external power to cutting platform 12. Feeder housing 14 receives the crop material from cutting platform 12, both grain and non-grain crop material, and transports the crop material to a separator within combine 10 in known manner (not shown). The grain crop material is separated from the non-grain crop material, cleaned and transported to a grain tank. The non-grain crop material is transported to a chopper, blower, etc. in known manner and distributed back to the field.

Cutting platform 12 generally includes a plurality of platform sections 16, 18 and 20, a cutterbar assembly 22 and a reel assembly 24. In the embodiment shown, platform section 16 is a center platform section, platform section 18 is a first wing platform section, and platform section 20 is a second wing platform section. Although shown with three platform sections, cutting platform 12 may be configured with more or less platform sections, depending upon the particular application.

Each platform section 16, 18 and 20 generally includes a frame 26, a plurality of float arms 28 coupled with a respective frame 26, a cutterbar 30 carried by the outboard ends of respective float arms 28, an endless belt 32, and a plurality of belt guides 34. The frame 26 of first wing platform section 18 and second wing platform section 20 are each pivotally coupled with center platform section 16, such that the outboard ends of first wing platform section 18 and second wing platform section 20 can move up and down independent from center platform section 16. To that end, a lift cylinder 36 coupled between the frame of combine 10 and feeder housing 14 lifts the entire cutting platform 12, a first tilt cylinder 38 coupled between the respective frame 26 of first wing platform section 18 and center platform section 16 pivotally moves first wing platform section 18 relative to center platform section 16, and a second tilt cylinder 40 coupled between the respective frame 26 of second wing platform section 20 and center platform section 16 pivotally moves second wing platform section 20 relative to center platform section 16.

Cutterbar assembly 22 includes two cutterbars 30 carried at the outboard ends of float arms 28 (i.e., at the leading edge of a platform section 16, 18 or 20). Each cutterbar 30 includes a plurality of knives 42 carried by a bar (not specifically shown). The particular type of knife can vary, such as a double blade knife (as shown) or a single blade knife. The bar is formed from a metal which is flexible to an extent allowing a desired degree of flexure across the width of cutting platform 12. In the embodiment shown, a majority of each cutterbar 30 is carried by a respective first wing platform section 18 or second wing platform section 20, with a lesser extent at the adjacent inboard ends of each cutterbar 30 being carried by center platform section 16. Cutterbars 30 are simultaneously driven by a single knife drive 44, providing reciprocating movement in concurrent opposite directions between cutterbars 30.

A plurality of knife guards 46 are positioned in opposition to knives 42 for providing opposing surfaces for cutting the crop material with knives 42. A plurality of keepers 48 spaced along cutterbars 30 have a distal end above cutterbars 30 for maintaining cutterbars 30 in place during reciprocating movement.

Float arms 28 may be pivoted at their connection locations with a respective frame 26. A float cylinder 50 coupled between a respective frame 26 and float arm 28 may be used for raising or lowering the outboard end of float arm(s) 28 at the leading edge of cutting platform 12. Each float cylinder 50 may also be placed in a "float" position allowing the connected float arm 28 to generally follow the ground contour during operation. More particularly, each float cylinder 50 is fluidly connected with an accumulator 52 carried by a platform section 16, 18 or 20. Accumulator 52 allows fluid to flow to and from attached float cylinders 50 such that no pressure build-up occurs. In this manner, the rams associated with each float cylinder 50 are free to move back and forth longitudinally, thereby allowing float arms 28 to follow the ground contour. When not in a float mode, float cylinders 50 can be actuated to move float arms 28 in an upward or downward direction. In the embodiment shown, each float cylinder 50 is a hydraulic cylinder, but could possibly be configured as a gas cylinder for a particular application.

Each float arm 28 is also associated with a respective roller 54. The plurality of rollers 54 for each platform section 16, 18 and 20 carry and are positioned within a loop of a respective endless belt 32. At the inboard end of first wing platform section 18 and second wing platform section 20 is a driven roller, and at the outboard end of first wing platform section 18 and second wing platform section 20 is an idler roller. The rollers positioned between the inboard drive roller and outboard idler roller at each float arm 28 also function as idler rollers. It will be appreciated that the number of float arms 28, and thus the number of rollers 54, may vary depending upon the overall width of cutting head 12 transverse to the travel direction.

Reel assembly 24 includes two reels 56, center reel support arm 58 and a pair of outer reel support arms 60. Outer reel support arms 60 are pivotally coupled at one end thereof with an outboard end of a respective first wing platform section 18 or second wing platform section 20. Outer reel support arms 60 rotationally carry a respective reel 56 at an opposite end thereof. Each outer reel support arm 60 may be selectively moved up and down using a hydraulic cylinder, and the pair of hydraulic cylinders are typically coupled in parallel so that they move together upon actuation.

Center reel support arm 58 is pivotally coupled at one end thereof with center platform section 16 above the opening leading to feeder housing 14. Center reel support arm 58 rotationally carries an inboard end of each reel 56 at an opposite end thereof. A hydraulic motor 62 or other suitable mechanical drive rotationally drives each reel 56. More particularly, hydraulic motor 62 drives a common drive shaft 64 through a chain and sprocket or other suitable arrangement (not shown). The rotational speed of reels 56 can be adjusted by an operator by adjusting the rotational speed of hydraulic motor 62.

Center reel support arm 58 may be selectively moved up and down using a hydraulic cylinder 66. Center reel support arm 58 is movable independently from outer reel support arms 60. To accommodate this independent movement, drive shaft 64 driven by hydraulic motor 62 is coupled at each end thereof via a universal joint 68 with a respective reel 56. This independent movement of center reel support arm 58 can be accomplished manually using a separate actuating switch or lever in operator's cab 70, or automatically using an electronic controller 72 located within cab 70 or other suitable location.

Each platform section 16, 18 and 20 has a leading edge which is configured to allow cutterbar assembly 22 to flex an appreciable extent in a localized manner across the width of cutting platform 12.

Figure 4:
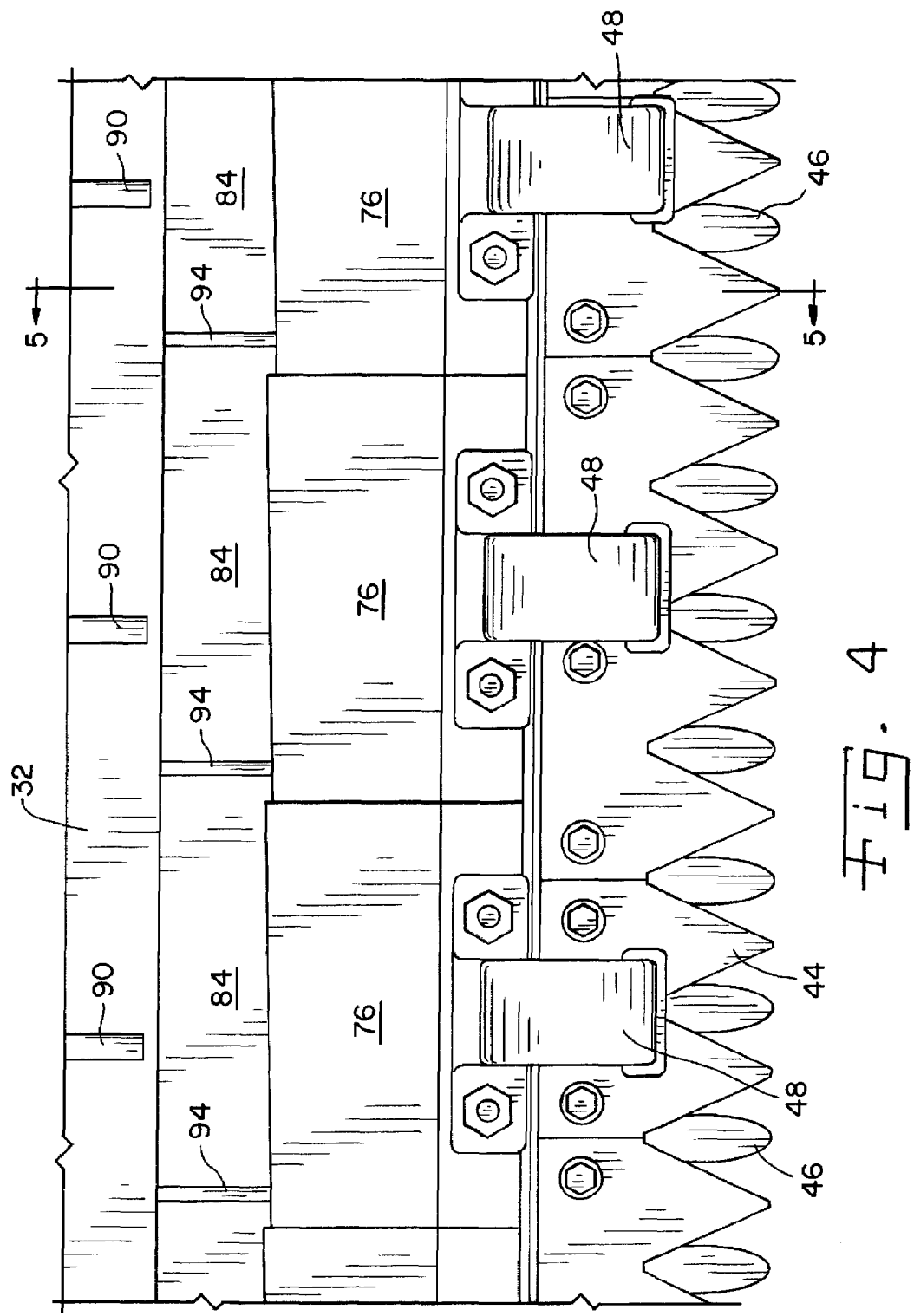
FIG. 4 is a fragmentary, top view of the leading edge of the cutting platform shown in FIGS. 1-3.
Figure 5:
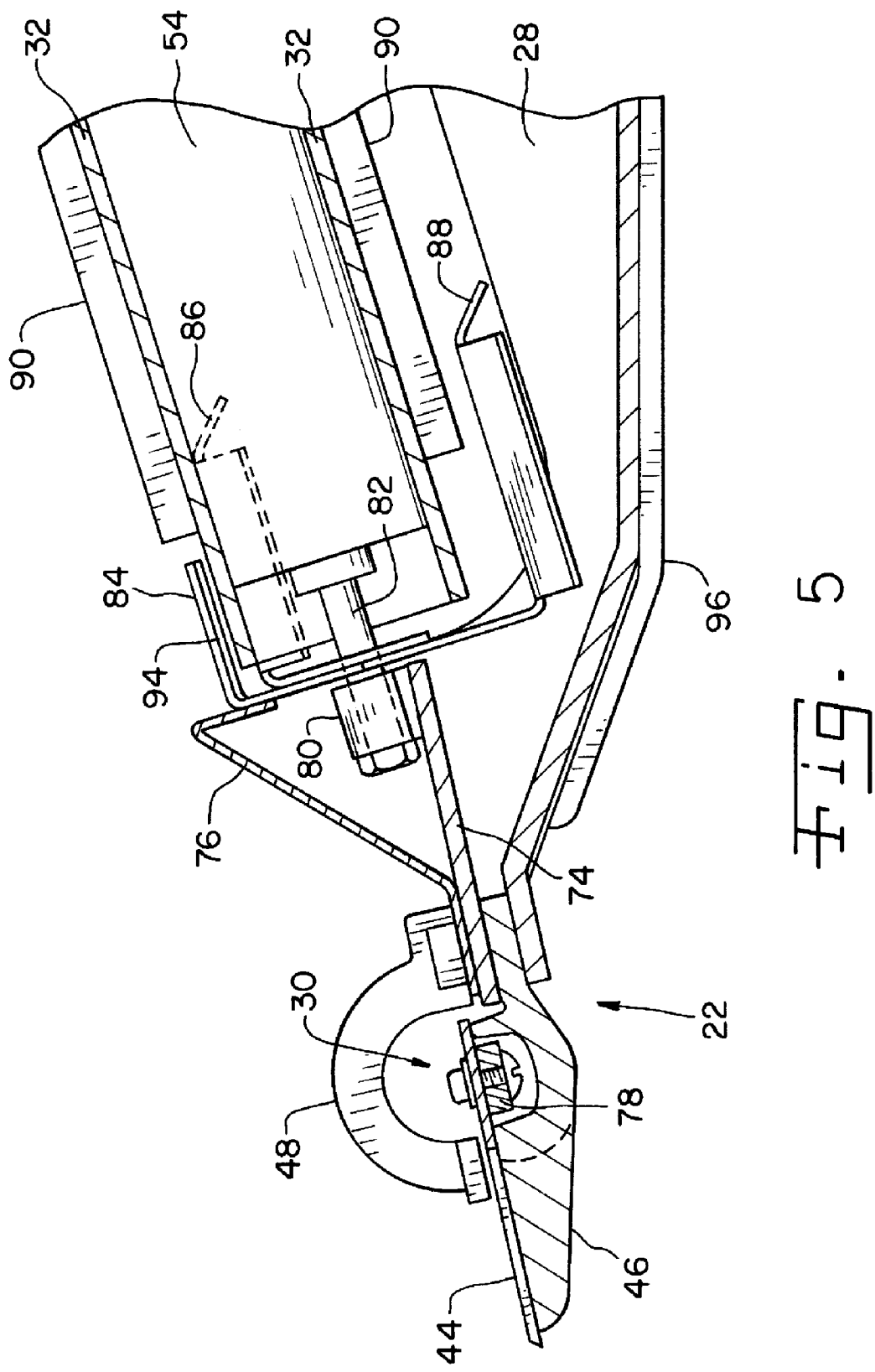
FIG. 5 is fragmentary, sectional view as viewed along line 5-5 in FIG. 4.

Referring to FIGS. 4 and 5, each float arm 28 has a distal end adjacent the leading edge of cutting platform 12. The float arms 28 associated with each respective platform section 16, 18 and 20 are mounted with a corresponding flexible substrate 74 extending substantially across the width of that particular platform section 16, 18 or 20. Flexible substrate 74 for each particular platform section 16, 18 and 20 in essence forms the backbone to which the other modular components (to be described hereinafter) are mounted and allows flexibility of the platform section across the width thereof. In the embodiment shown, flexible substrate 74 is a steel plate with various mounting holes formed therein, and has a modulus of elasticity providing a desired degree of flexibility. The geometric configuration and material type from which flexible substrate 74 is formed may vary, depending upon the application.

The distal end of each float arm 28 is fastened to a knife guard 46, flexible substrate 74, crop ramp 76 and hold down 48. Cutterbar 30, including blades 44 carried by bar 78, is reciprocally carried by knife guards 46. Hold downs 48 which are spaced across the width of cutterbar 30 retain bar 78 within the corresponding grooves formed in knife guards 46.

Crop ramps 76 are overlapped but not rigidly attached to each other, thereby allowing flexure during harvesting operation. Each crop ramp 76 forms an upper ledge positioned above endless belt 32 which assists in maintaining the crop material on endless belt 32 as it is transported toward feeder housing 14. In the embodiment shown in FIG. 5, crop ramp 76 has a flat, angled orientation to assist in transport of the crop material from cutterbar assembly 22 to endless belt 32. For certain applications, it may be possible to eliminate crop ramps 76.

A bushing housing 80 also mounted to flexible substrate 74 carries a bushing (not shown) which in turn carries a mount 82 for rotatably supporting roller 54.

Figure 6:
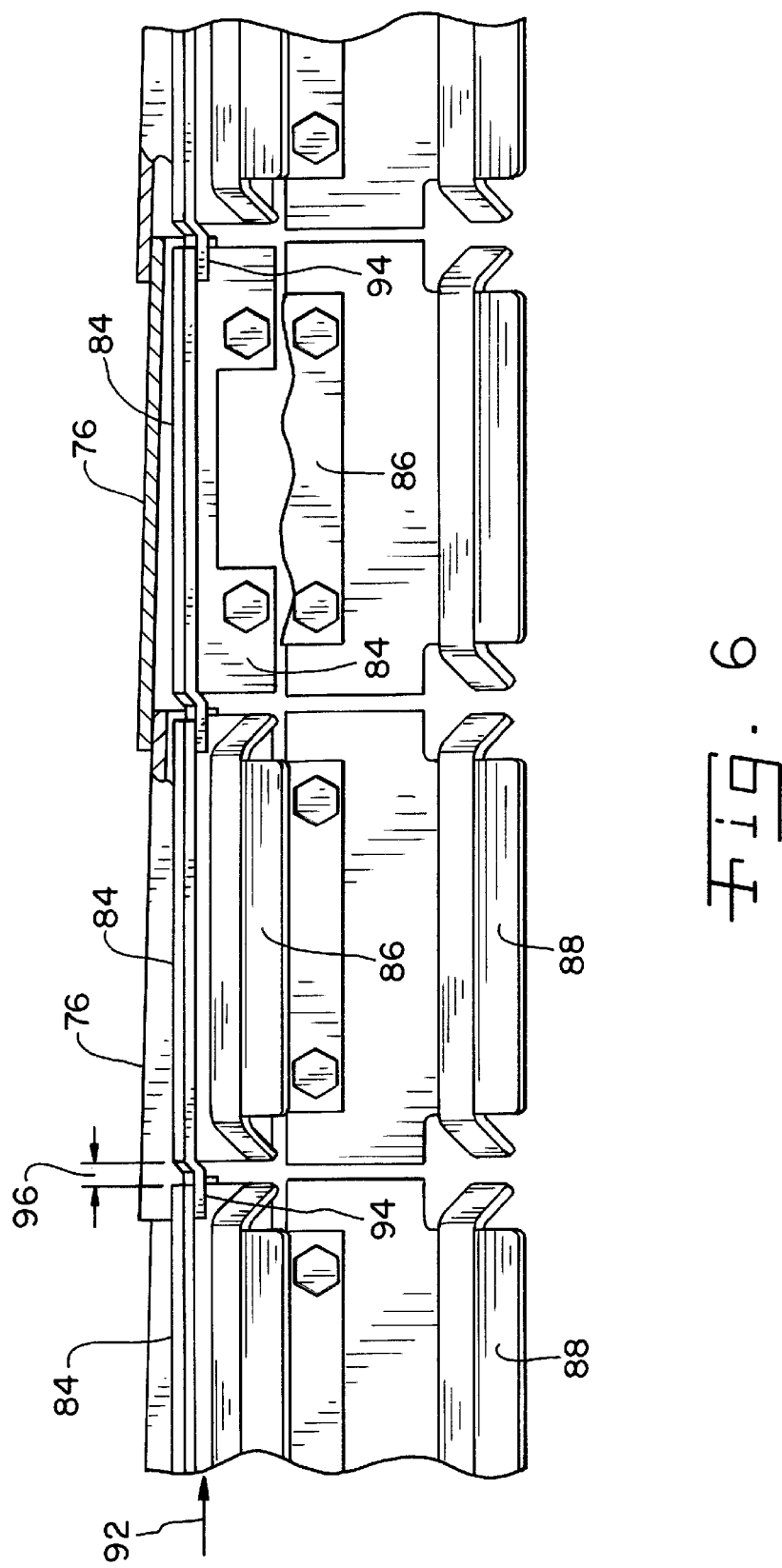
FIG. 6 is fragmentary, perspective view illustrating the belt guides, as viewed from the right of FIG. 5.

As best seen in FIGS. 5 and 6, endless belt 32 is guided by a plurality of belt guides 84, upper run carriers 86 and lower run carriers 88. Endless belt 32 has a plurality of spaced apart cleats 90 which do not extend to the lateral side edges thereof, allowing belt 32 to travel between belt guides 84 and upper run carriers 86 without unnecessary clearance space therebetween.

Each belt guide 84 is positioned adjacent to but is not connected with a corresponding crop ramp 76. The number and width of belt guides 84 substantially corresponds to the number and width of crop ramps 76. Each belt guide 84 has a generally L-shaped cross-sectional configuration with leading and trailing edges (relative to the direction of travel of endless belt 32) which are overlapped relative to each other. In FIG. 6, the direction of travel of the upper run of endless belt 32 between belt guides 84 and upper run carriers 86 is indicated by directional arrow 92. As will be observed, each belt guide 84 includes a tongue 94 which is underlapped with an adjacent belt guide 84. The direction of underlapping between adjacent belt guides 84 is generally opposite to the travel direction of endless belt 32. On the other hand, the crop material which is carried by endless belt 32 also slides along the upper surface of each belt guide 84. The underlap arrangement between adjacent belt guides 84 is in the same direction as the crop material movement across the upper surfaces thereof, resulting in less resistance and accumulation of the crop material as it slides along belt guides 84.

As described above with regard to crop ramp 76, belt guides 84 also may move relative to each other during flexure of cutting platform 12. To accommodate such movement, adjacent belt guides 84 are underlapped in a manner providing a clearance distance 96 therebetween. In the embodiment shown in FIG. 6, clearance distance 96 is between 4 to 25 millimeters, preferably approximately between 6 to 12 millimeters. This clearance distance has been found to be suitable to prevent impingement between adjacent belt guides 84 during maximum flexure in a downward direction.

Upper run carriers 86 and lower run carriers 88 each have down turned leading and trailing edges to prevent catching with endless belt 32. As may be observed in FIG. 6, each upper run carrier 86 and generally vertically aligned lower run carrier 88 are positioned in correspondence with and generally below a belt guide 84 and crop ramp 76. Endless belt 32 is for the most part in fact carried by the upper surfaces of upper run carriers 86 during operation. Conversely, endless belt 32 typically does not ride along the upper surfaces of lower run carriers 88, which assist in guiding endless belt 32 in the event of belt sagging, etc.

Configured as shown in FIG. 5, the leading edge of cutting platform 12 has a projected height of between approximately 3 to 4 inches. The projected height is primarily defined by the distance between skid shoe 96 and the upper extent of crop ramp 76.

During harvesting operation, float arms 28 are placed in a float state allowing free upward and downward movement as combine 10 traverses over the ground surface. Cutterbar assembly 22 moves up and down with float arms 28 on a localized basis, and crop ramps 76 and belt guides 84 move relative to each other to allow the flexibility at the leading edge of each platform section 16, 18 and 20. Belt guides 84 also cause each belt 32 to follow the cutterbar assembly by holding down on the upper surface of the belt as cutterbar assembly 22 locally dips downward. This prevents crop material from entering beneath belt 32. The present invention therefore provides a cutting platform which flexes to a high degree, efficiently moves crop material to the feeder housing, and maximizes harvest yield by better following the ground contour.

Figure 7:
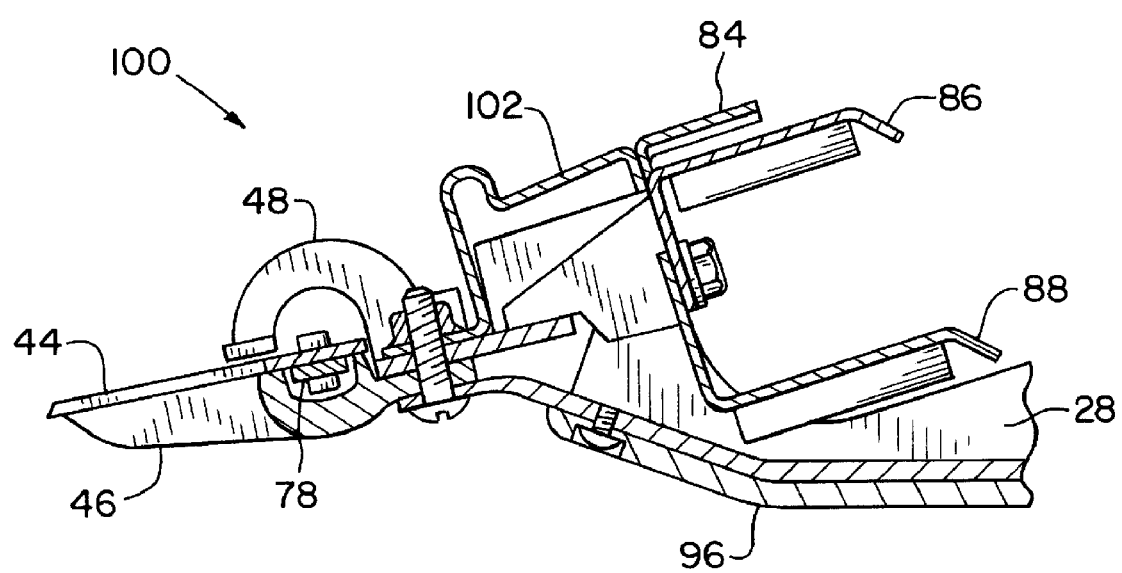
FIG. 7 is a fragmentary, side sectional view taken at the leading edge of another embodiment of a cutting platform of the present invention.

Referring now to FIG. 7, there is shown a fragmentary, sectional view through the leading edge of another embodiment of a cutting platform 100 of the present invention. The embodiment shown in FIG. 7 is in many respects similar to the embodiment shown in FIG. 5 and described above. The primary difference is that cutting platform 100 includes a plurality of adjacent and overlapped crop ramps 102 with a generally vertical front wall and the crop retaining ledge shifted closer to the cutterbar adjacent the front wall. This allows more room under the crop ramps for accommodating the various components which are interconnected together. Additionally, shifting the crop retaining ledge to the front wall which is closer to the cutterbar allows the crop material to be shifted onto the upper deck adjacent endless belt 32 sooner, and also provides a slightly larger carrying surface as the crop material is moved toward feeder housing 14.

Referring now to FIGS. 8-12, there is shown a portion of another embodiment of a cutting platform 110 of the present invention. Cutting platform 110 is similar in many respects to the embodiment of cutting platform 12 shown in FIGS. 1-6 and described above. To that end, cutting platform 110 may include a pair of wing platform sections and a center platform section, with each platform section carrying a cutterbar assembly 112 and a respective endless belt 114. Each platform section also carries a number of adjacent and overlapped belt guides 116 which can move relative to each other.

As described above with reference to FIGS. 1-6, belt guides 84 overlap from one belt guide to the next. The direction of overlap between adjacent belt guides 84 is generally opposite to the travel direction of endless belt 84. On the other hand, the overlap arrangement between adjacent belt guides 84 is in the same direction as the crop material movement across the upper surfaces thereof. This results in a smooth upper transition from one belt guide to the next so that crop material does not accumulate as it slides along the upper surfaces of adjacent belt guides 84.

However, with a belt guide 84 formed from metal as shown in FIGS. 1-6, the overlap is formed by bending the longitudinal end of the belt guide to form an underlap to provide the smooth upper transition between adjacent belt guides for the crop material. Machining the metal belt guide 84 so as not to have an underlap would likely be too expensive for the many belt guides that are utilized across the width of the cutting platform. This results in the underlap extending below the belt guide in a direction against the travel direction of the endless belt, which can possibly result in undue wear and early replacement of the endless belt.

In contrast, belt guides 116 are formed with both a smooth upper transition and a smooth lower transition between adjacent belt guides 116, resulting in no or little accumulation of crop material above the belt guides, and no extra wear to the endless belt below the belt guides.

More particularly, each belt guide 116 has a rear edge 118 with an upper surface 120 and a lower surface 122. Lower surface 122 partially overlies a leading edge 124 of endless belt 114. Upper surface 120 and lower surface 122 each have a continuous, uninterrupted contour. That is, there are no abrupt discontinuities such as recesses or projections which might tend to accumulate crop material (on top) or wear the endless belt (below). In the embodiment shown, upper surface 120 and lower surface 122 are each generally planar, but could also be formed with a slight curvature (e.g., simple or compound curvature).

Each belt guide 116 also has a pair of longitudinal ends 128. Each longitudinal end 128 has an overlap 130 which is configured for a smooth upper transition and/or a smooth lower transition with an adjacent belt guide 116 when installed on cutting platform 110. In the case of a smooth upper transition, there are no discontinuities in the area of the overlap 130 which extend above the upper surface 120. In the case of a smooth lower transition, there are no discontinuities in the area of the overlap 130 which extend below the lower surface 122.

By providing an overlap with both a smooth upper transition and smooth lower transition between adjacent belt guides 116, it is possible to form belt guides 116 from plastic in the illustrated embodiment. If belt guides 116 were formed from plastic and had an underlap, such as belt guides 84 described above, then the endless belt 114 would wear against the underlap and likely wear off the underlap between adjacent belt guides, which obviously would not be desirable.

In the embodiment shown, each end 128 has a complimentary overlap 130 with a lip 132 which is approximately one-half the thickness of end 128 (and also one-half the thickness of rear edge 118). By forming lip 132 with a thickness which is only a partial thickness of end 128, complimentary lips 132 may overlie each other and still only have a thickness corresponding to end 128. Each lip 132 need not be one-half the thickness of end 128, but could be a different proportional thickness which still totals the thickness of end 128. For example, one lip 132 could be approximately 60% of the thickness of end 128 and the other complimentary lip 132 could be approximately 40% of the thickness of end 128.

The direction of overlap between adjacent belt guides 116 is generally opposite to the travel direction of endless belt 114. However, by providing a smooth lower transition between adjacent belt guides 116, there is no undue wear to either the lip 132 or the endless belt 114. Further, the direction of overlap between adjacent belt guides 116 is in the same direction as the crop material movement across the upper surfaces thereof, resulting in little or no accumulation of crop material on top of belt guides 116.

It will be appreciated that there is a slight gap in the area of the overlap between adjacent belt guides 116 to allow movement of the plurality of belt guides 116 relative to each other and thereby provide for localized movement of the cutterbar assembly 112. In the embodiment shown, longitudinal ends 128 have a gap of between 0 to 1.5 mm.

Each belt guide 116 is fastened to a corresponding belt support 134 using a three point connection for a secure and substantially immovable connection. More particularly, each belt guide 116 includes a pair of clip holes 136 at a forward end thereof. Each belt support 134 likewise includes a pair of upwardly extending clips 138 which are positioned to slide into and engage a corresponding clip hole 136. Clips 138 are generally C-shaped in cross section and face in a forward direction. Clips 138 and clip holes 136 form two attachment points of the three point connection.

Figure 11:
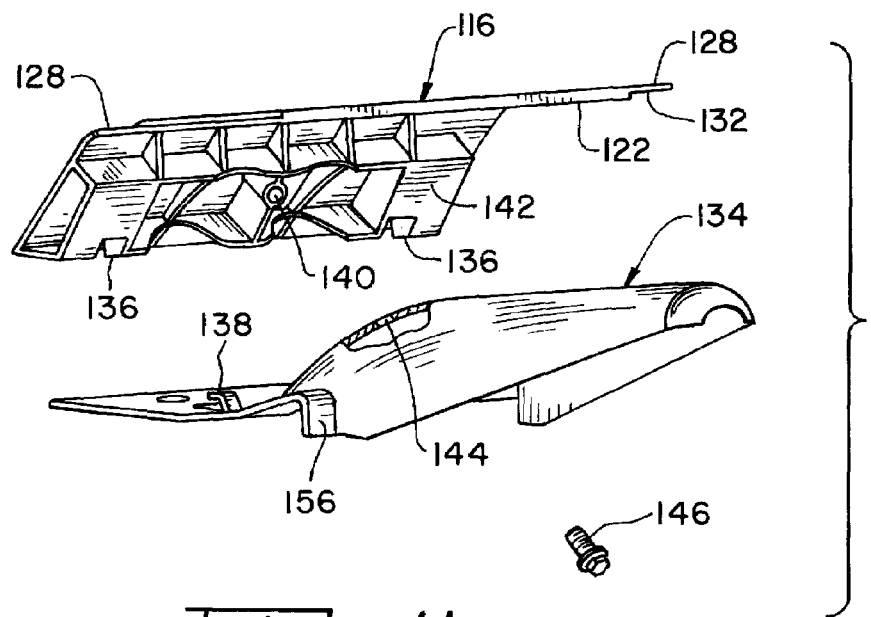
FIG. 11 is an exploded, rear perspective view of the belt guide and belt support shown in FIGS. 8-10.
Figure 12:
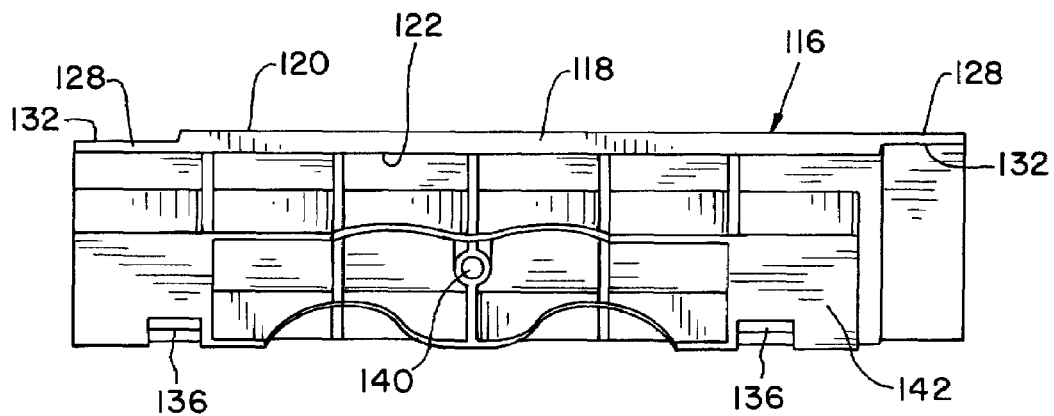
FIG. 12 is a rear view of the belt guide shown in FIG. 11.
Figure 13:
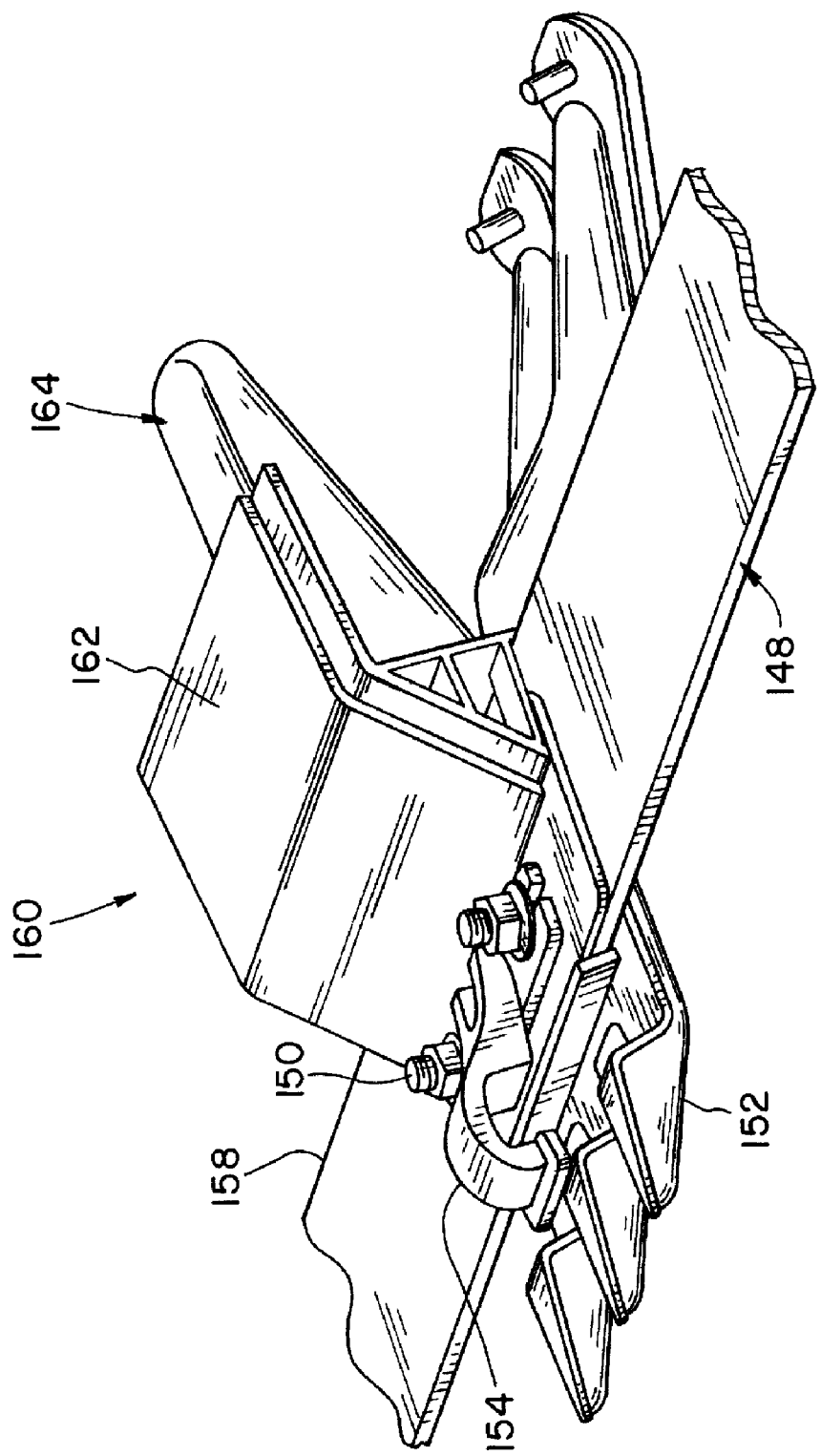
FIG. 13 is a fragmentary, front perspective view of the leading edge of yet another embodiment of a cutting platform of the present invention.
Figure 14:
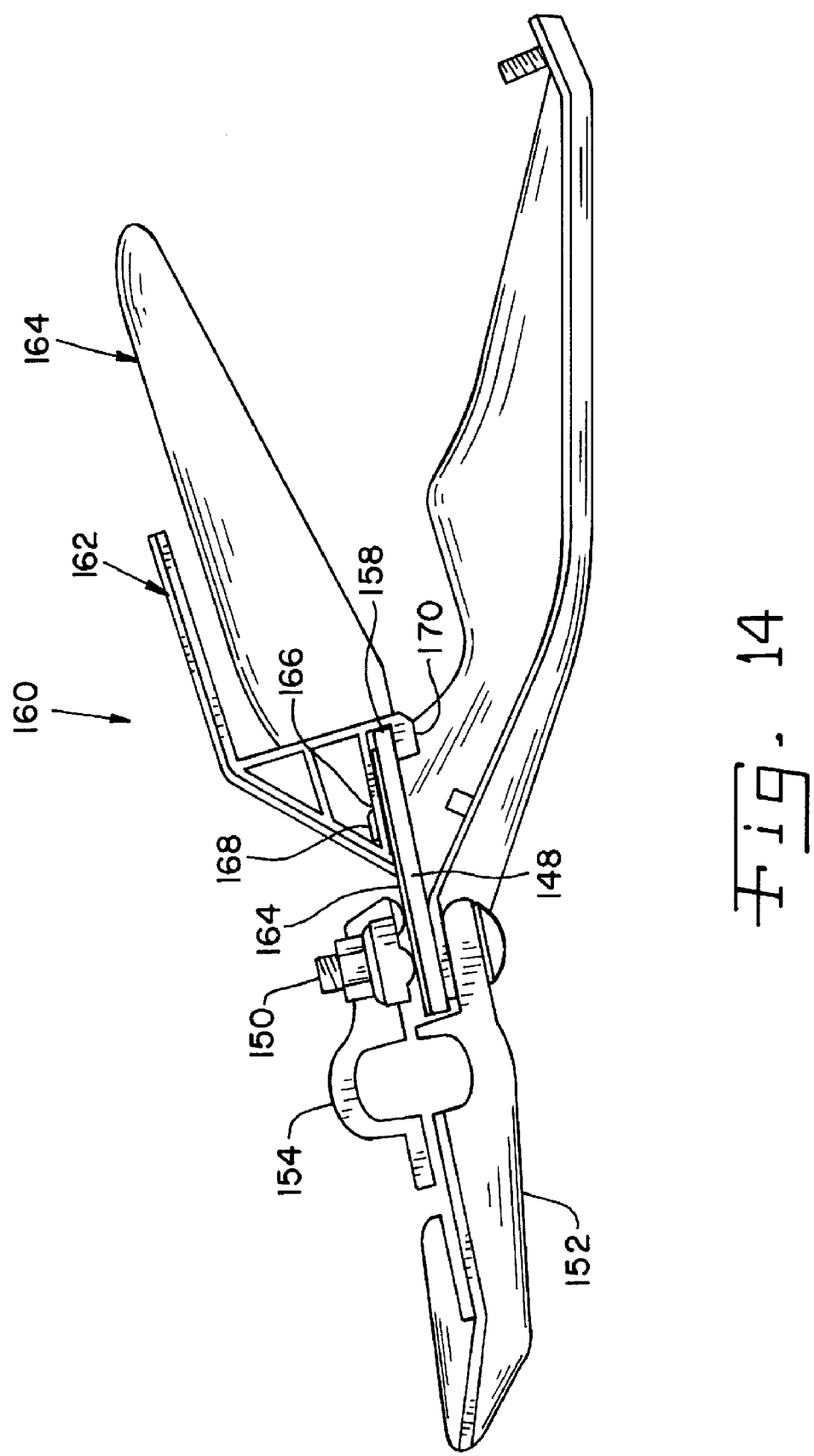
FIG. 14 is a fragmentary, side sectional view taken at the leading edge of FIG. 13.
Figure 15:
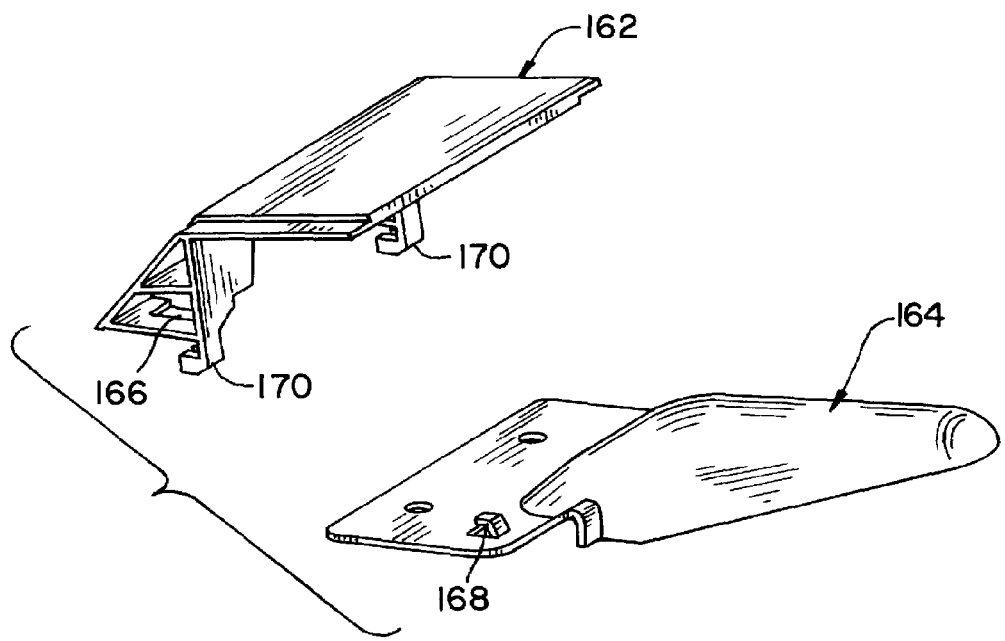
FIG. 15 is an exploded, rear perspective view of the belt guide and belt support shown in FIGS. 13-14.
Figure 16:
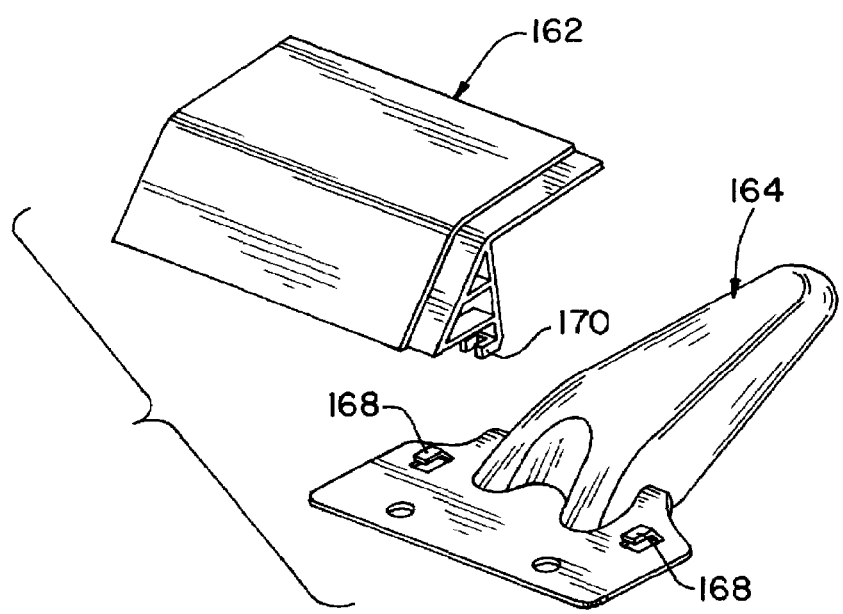
FIG. 16 is an exploded, front perspective view of the belt guide and belt support shown in FIGS. 13-15.

For the third attachment point, belt guide 116 includes a threaded bolt hole 140 in a rear surface 142 (FIG. 11). Belt support 134 includes a thru-hole 144 which is in general alignment with bolt hole 140. A bolt 146 passes through thru-hole 144 and is threaded into a bolt hole 140.

Figure 8:
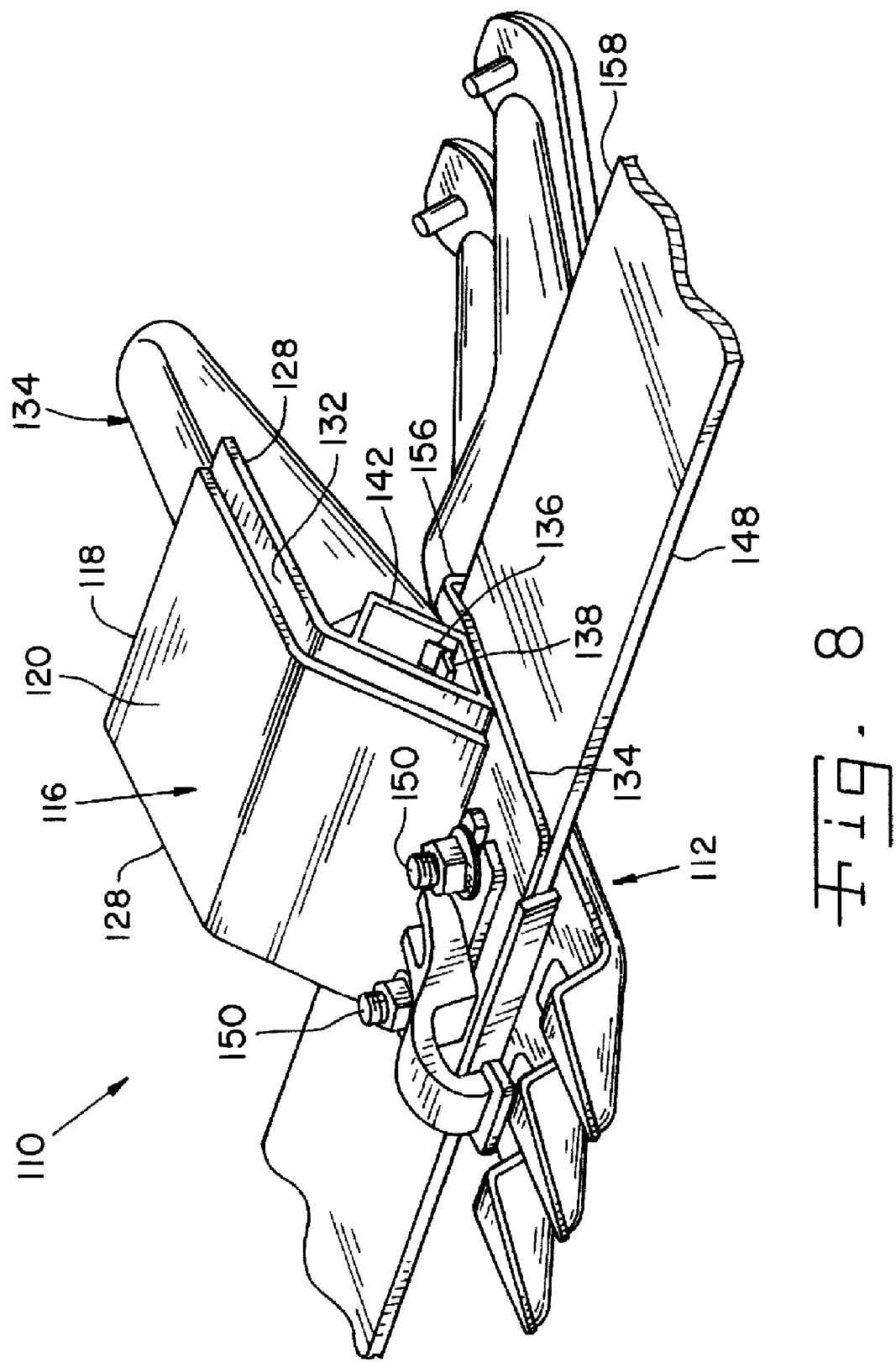
FIG. 8 is a fragmentary, front perspective view of the leading edge of another embodiment of a cutting platform of the present invention.
Figure 6:
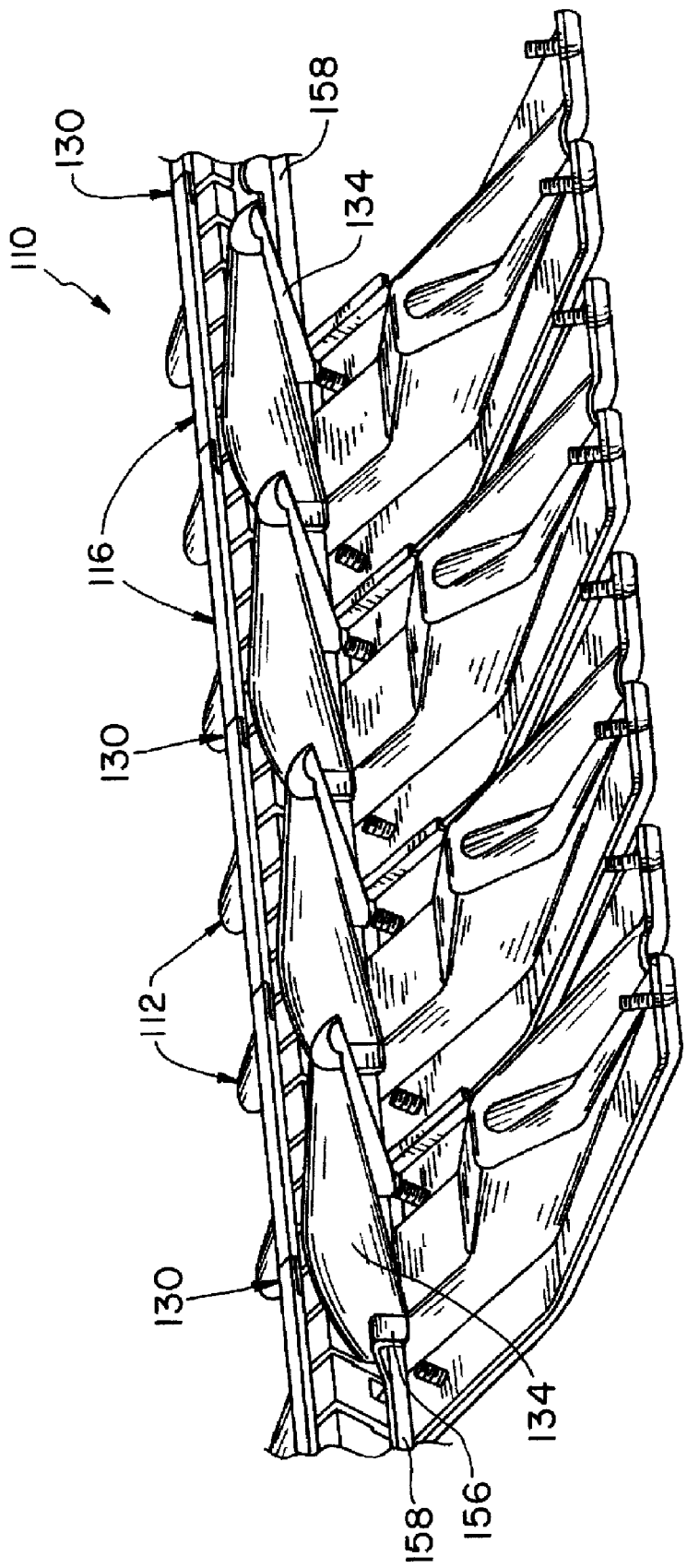
Figure 10:
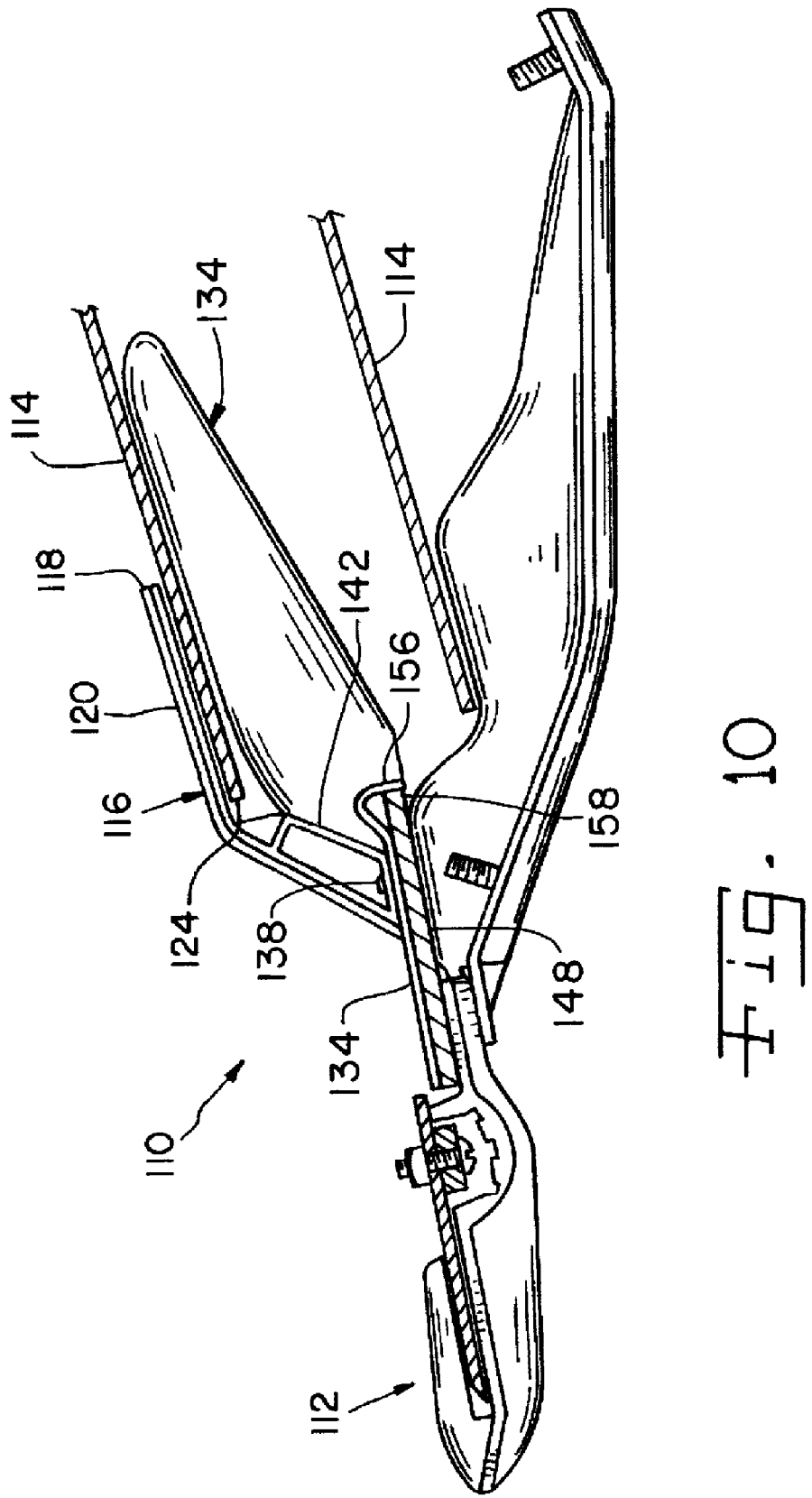
FIG. 10 is a fragmentary, side sectional view taken at the leading edge of FIGS. 8 and 9, with the hold-downs removed.

Belt supports 134 are stamped metal parts which are partially positioned under and support endless belt 114. Belt supports 134 are fastened to a flexible substrate 148 of cutterbar assembly 112. In particular, flexible substrate 148 forms the flexible backbone of cutterbar assembly 112, and each belt support 134 is fastened to flexible substrate 148 using a plurality of fasteners, such as carriage bolts 150 (FIG. 8). Each bolt 150 passes through a knife guard 152, flexible substrate 148, belt support 134, and hold-down 154. Each belt support 134 further includes a pair of downwardly extending flanges 156 at a rear end thereof which abut against a rear edge 158 of flexible substrate 148.

Referring now to FIGS. 13-16, there is shown a portion of the leading edge of yet another embodiment of a cutting platform 160 of the present invention. Cutting platform 160 is similar in many respects to the embodiment of cutting platform 110 shown in FIGS. 8-12 and described above. The primary difference is that each belt guide 162 has a four point connection with a belt support 164, thereby again forming a secure and substantially immovable connection.

Each belt guide 162 has a pair of clip holes 166 at the forward end thereof which receive a corresponding pair of forwardly facing clips 168 extending upwardly from a belt support 164, the same as in the embodiment shown in FIGS. 8-12. However, rather than using a bolt to interconnect a belt guide 162 with a belt support 164, each belt guide 162 has a pair of fingers 170 at a rear end thereof. Each finger 170 wraps around the rear edge 158 of flexible substrate 148. Clips 168 prevent relative movement between belt guide 162 and belt support 164 in one direction, and fingers 170 prevent relative movement between belt guide 162 and belt support 164 in the opposite direction. Belt supports 164 are again attached to flexible substrate 148 using carriage bolts 150.

Having described the preferred embodiment, it will become apparent that various modifications can be made without departing from the scope of the invention as defined in the accompanying claims.

The invention claimed is:

1. A cutting platform for use with an agricultural harvesting machine, comprising:
a plurality of platform sections, at least one said platform section including:
a flexible cutterbar assembly movable in a localized manner in upwards and downwards directions;
an endless belt having a leading edge;
a plurality of belt supports mounted to said cutterbar assembly, each said belt support at least partially positioned under said leading edge of said endless belt, each said belt support including at least one upwardly extending clip; and
a plurality of belt guides, each said belt guide partially overlying said leading edge of said endless belt, each said belt guide including at least one clip hole for removably receiving a corresponding said clip, and a rear surface which is attached to one of a conesponding said belt support and said cutterbar assembly.

2. The cutting platform of claim 1, wherein said at least one clip hole includes a pair of clip holes positioned toward a forward end of a corresponding said belt guide, and said at least one clip includes a pair of clips respectively received in a corresponding said clip hole.

3. The cutting platform of claim 1, wherein each said clip is a generally C-shaped clip facing in a forward direction.

4. The cutting platform of claim 1, wherein each said belt guide includes a bolt hole in said rear surface and a corresponding said belt support includes an aligned bolt thru-hole, and including a threaded bolt passing through said thru-hole and threaded into said bolt hole.

5. The cutting platform of claim 1, wherein said cutterbar assembly includes a flexible substrate, each said belt support being fastened to said flexible substrate using a plurality of fasteners, each said belt support further including a pair of downwardly extending flanges at a rear end thereof which abut against a rear edge of said flexible substrate.

6. The cutting platform of claim 1, wherein said cutterbar assembly includes a flexible substrate, and each said belt guide includes a pair of fingers at a rear end thereof which wrap around a rear edge of said flexible substrate.

7. The cutting platform of claim 1, wherein said belt guides are movable relative to each other and overlap along adjacent side edges.

8. The cutting platform of claim 1, wherein said plurality of belt guides are formed from plastic and said plurality of belt supports are formed from stamped metal.

9. An agricultural harvesting machine, comprising:
a base unit including a feeder housing; and
a cutting platform attached to said feeder housing, said cutting platform including a plurality of platform sections, at least one said platform section including:
a flexible cutterbar assembly movable in a localized manner in upwards and downwards directions;
an endless belt having a leading edge;
a plurality of belt supports mounted to said cutterbar assembly, each said belt support at least partially positioned under said leading edge of said endless belt, each said belt support including at least one upwardly extending clip; and
a plurality of belt guides, each said belt guide partially overlying said leading edge of said endless belt, each said belt guide including at least one clip hole for removably receiving a corresponding said clip, and a rear surface which is attached to one of a conesponding said belt support and said cutterbar assembly.

10. The agricultural harvesting machine of claim 9, wherein said at least one clip hole includes a pair of clip holes positioned toward a forward end of a conesponding said belt guide, and said at least one clip includes a pair of clips respectively received in a corresponding said clip hole.

11. The agricultural harvesting machine of claim 9, wherein each said clip is a generally C-shaped clip facing in a forward direction.

12. The agricultural harvesting machine of claim 9, wherein each said belt guide includes a bolt hole in said rear surface and a corresponding said belt support includes an aligned bolt thru-hole, and including a threaded bolt passing through said thru-hole and threaded into said bolt hole.

13. The agricultural harvesting machine of claim 9, wherein said cutterbar assembly includes a flexible substrate, each said belt guide being fastened to said flexible substrate using a plurality of fasteners, each said belt guide further including a pair of downwardly extending flanges at a rear end thereof which abut against a rear edge of said flexible substrate.

14. The agricultural harvesting machine of claim 9, wherein said cutterbar assembly includes a flexible substrate, and each said belt guide includes a pair of fingers at a rear end thereof which wrap around a rear edge of said flexible substrate.

15. The agricultural harvesting machine of claim 9, wherein said belt guides are movable relative to each other and overlap along adjacent side edges.

16. The agricultural harvesting machine of claim 9, wherein said plurality of belt guides are formed from plastic and said plurality of belt supports are formed from stamped metal.

* * * * *

UNITED STATES PATENT AND TRADEMARK OFFICE
CERTIFICATE OF CORRECTION

| | |
|---|---|
| PATENT NO. | : 7,600,364 B2 |
| APPLICATION NO. | : 12/173445 |
| DATED | : October 13, 2009 |
| INVENTOR(S) | : Lovett et al. |

Page 1 of 1

It is certified that error appears in the above-identified patent and that said Letters Patent is hereby corrected as shown below:

COLUMN 9
    Line 39, delete "conesponding", and substitute therefore --corresponding--; and COLUMN 10
    Line 26, delete "conesponding", and substitute therefore --corresponding--; and
    Line 30, delete "conesponding", and substitute therefore --corresponding--.

Signed and Sealed this

Twenty-third Day of February, 2010

David J. Kappos
*Director of the United States Patent and Trademark Office*